United States Patent
Burbach

(10) Patent No.: US 9,470,254 B2
(45) Date of Patent: Oct. 18, 2016

(54) COMBINATION HAVING AN ANCHOR FOR PANEL-LIKE COMPONENTS, AND A FIXING ARRANGEMENT

(71) Applicant: fischerwerke GmbH & Co. KG, Waldachtal (DE)

(72) Inventor: Jochen Burbach, Horb (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 0 days.

(21) Appl. No.: 14/435,643

(22) PCT Filed: Nov. 7, 2013

(86) PCT No.: PCT/EP2013/003344
§ 371 (c)(1),
(2) Date: Apr. 14, 2015

(87) PCT Pub. No.: WO2014/075777
PCT Pub. Date: May 22, 2014

(65) Prior Publication Data
US 2015/0285285 A1    Oct. 8, 2015

(30) Foreign Application Priority Data

Nov. 13, 2012    (DE) .................. 10 2012 110 868

(51) Int. Cl.
*F16B 13/06*    (2006.01)
*F16B 5/02*    (2006.01)
(Continued)

(52) U.S. Cl.
CPC ......... *F16B 5/0208* (2013.01); *E04F 13/0816* (2013.01); *E04F 13/144* (2013.01)

(58) Field of Classification Search
CPC .... F16B 5/0208; F16B 13/06; F16B 13/063; F16B 13/066; F16B 13/124; E04F 13/0816; E04F 13/144

USPC .............. 411/44, 49, 55, 80.5–80.6
See application file for complete search history.

(56) References Cited

U.S. PATENT DOCUMENTS 3,512,448 A * 5/1970 Jeal .................. F16B 13/063
411/32
3,958,488 A * 5/1976 Fischer ............... E04F 13/0853
411/44
(Continued)

FOREIGN PATENT DOCUMENTS

DE    29 16 925 A1    11/1980
DE    40 14 812 A1    11/1991
(Continued)

OTHER PUBLICATIONS

International Search Report for corresponding International Application No. PCT/EP2013/003344 mailed May 2, 2014.
(Continued)

*Primary Examiner* — Roberta Delisle
(74) *Attorney, Agent, or Firm* — Renner, Otto, Boisselle & Sklar, LLP

(57) ABSTRACT

The invention relates to the fixing of a natural ashlar panel to a substructure with an anchor having an internal thread. The invention proposes that the corresponding blind hole be drilled to residual wall thickness R and the anchor be set in a recessed position. The natural ashlar panels with the anchors can thus be transported to the building site in the form of a compact stack. At the building site, a bolt having a stop element is mounted, which stop element is supported on the anchor. At the opposite end the substructure is clamped against the stop element. In that way, the distance of the outer surface of the natural ashlar panel from the substructure is constant even in the event of varying thicknesses D of the natural ashlar panels. As a result, laborious adjustment work is avoided.

16 Claims, 3 Drawing Sheets

(51) Int. Cl.
*E04F 13/08* (2006.01)
*E04F 13/14* (2006.01)

(56) References Cited

U.S. PATENT DOCUMENTS

| | | | | |
|---|---|---|---|---|
| 4,026,184 A * | 5/1977 | Sozzi | ............... | F16B 13/065 411/19 |
| 4,028,988 A * | 6/1977 | Schafers | ............... | F16B 13/066 403/290 |
| 4,519,735 A * | 5/1985 | Machtle | ............... | F16B 13/066 405/259.3 |
| 4,614,471 A * | 9/1986 | Mauritz | ............... | F16B 13/128 405/259.3 |
| 4,919,579 A * | 4/1990 | Miyanaga | ............ | F16B 13/065 411/55 |
| 4,940,372 A * | 7/1990 | Fischer | ............... | F16B 13/065 411/32 |
| 4,943,195 A * | 7/1990 | Fischer | ............... | F16B 13/063 411/54 |
| 5,076,746 A * | 12/1991 | Fischer | ............... | F16B 13/065 411/44 |
| 5,085,546 A * | 2/1992 | Fischer | ............... | B25D 17/005 411/3 |
| 5,685,678 A * | 11/1997 | Giannuzzi | ............ | F16B 13/066 411/55 |
| 5,702,214 A * | 12/1997 | Duran | ............... | F16B 5/02 411/24 |
| 5,993,129 A * | 11/1999 | Sato | ............... | F16B 13/124 411/43 |
| 6,048,148 A * | 4/2000 | Gassner | ............ | F16B 13/0858 411/54 |
| 6,827,535 B2 * | 12/2004 | Fuchs | ............... | F16B 1/0071 411/44 |
| 8,192,122 B2 * | 6/2012 | Gaudron | ............... | F16B 13/066 411/32 |
| 9,033,637 B2 * | 5/2015 | Mitrovic | ............... | F16B 5/0275 411/338 |
| 2010/0135743 A1 * | 6/2010 | Gaudron | ............... | F16B 13/065 411/55 |
| 2011/0158766 A1 * | 6/2011 | Mitrovic | ............... | F16B 5/0275 411/393 |

FOREIGN PATENT DOCUMENTS

| | | |
|---|---|---|
| DE | 41 30 823 A1 | 3/1993 |
| DE | 296 19 514 U1 | 3/1998 |
| DE | 200 07 514 U1 | 9/2001 |
| DE | 20 2012 001 544 U1 | 3/2012 |
| EP | 0 658 666 A1 | 6/1995 |
| EP | 1150024 A1 | 10/2001 |

OTHER PUBLICATIONS

German Search Report issued Aug. 28, 2013 for related German Application No. 10 2012 110 870.6.
International Preliminary Report on Patentability for corresponding International Application No. PCT/EP2013/003344 mailed May 19, 2015 and English translation.

* cited by examiner

COMBINATION HAVING AN ANCHOR FOR PANEL-LIKE COMPONENTS, AND A FIXING ARRANGEMENT

TECHNICAL FIELD OF INVENTION

The invention relates to the combination of an anchor for panel-like components and a bolt.

DISCUSSION OF RELATED ART

For fixing natural ashlar panels, for example of sandstone or granite, metal anchors are known which can be anchored in an undercut blind hole. By means of the anchors, the natural ashlar panels can be joined to a substructure which in turn is fixed to a building. They accordingly serve to form the façade. In this context an undercut blind hole is understood as being a blind hole which becomes wider in the direction of the base of the blind hole. The fischer Zykon panel anchor FZP-I is a known example of such an anchor having an internal thread which can be set flush in an undercut blind hole, the blind hole initially extending cylindrically towards its base and then widening conically. For fixing the substructure, for example a profile or an angle piece, the latter is fixed on the anchor using a fixing screw, the fixing screw being screwed into the internal thread of the anchor through an opening in the substructure.

The advantage of such an anchor having an internal thread is that the natural ashlar panel can be finished in the form of a panel-like component including the anchor at a works and the components can simply be stacked for transport to the building site in question, since the anchors are flush in the drilled hole. In contrast thereto, this is not possible in the case of the more advantageous anchors having a protruding bolt. The latter are therefore frequently set in place only onsite at the building site. The internal thread also means, however, that the anchor has to terminate flush with the surface, that is to say flush with the plane defined by the mouth of the blind hole. That surface is referred to as the inner surface hereinbelow, because in the case of a façade it faces towards the building, unlike the outer surface which forms the visible face. If the anchor were to be set in a recessed position, that is to say with the rear end displaced into the interior of the component, the substructure would be supported on the inner surface and by tightening the fixing screw a permanent pull-out force would be exerted on the component. Since this is in addition to other forces and moments, for example resulting from inherent weight or wind suction forces, the holding values of the anchor are thereby reduced and the fixing arrangement may fail even as the screw is tightened. If, however, the anchor terminates flush with the inner surface, the substructure is supported on the anchor itself. This would indeed also be achieved by a protruding anchor, but that would again make the natural ashlar panels more difficult to stack.

However, setting the anchor flush with the inner surface often requires laborious adjustment work because the thicknesses of natural ashlar panels are subject to production-related variations. If all the components, starting from the position of the anchor, were to be fixed at the same distance from the building, the outer face of the façade, seen across a plurality of natural ashlar panels, would have an irregular outer surface. In the case of the mentioned anchors having protruding bolts, this problem is avoided by drilling the blind holes to different depths depending upon the thickness of the natural ashlar panel and accordingly the anchors also sit at different depths. Drilling is therefore carried out "to a residual wall thickness", that is to say the distance from the base of the blind hole to the outer surface is constant in each case. The fixing of the substructure is effected, for example, against a projecting sleeve of the anchor. Adjustment of each natural ashlar panel is unnecessary, so that the mounting of the façade can take place comparatively quickly. In the case of anchors having an internal thread, however, this is not possible on account of the said necessity for flush termination with the inner surface.

The problem of the invention is to improve the fixing of panel-like components, especially natural ashlar panels, so that the panel-like components having pre-mounted anchors are readily stackable but nevertheless can be mounted quickly.

SUMMARY OF THE INVENTION

That problem is solved according to the invention by proposing that an anchor having an internal thread be anchored in a panel-like component, especially a natural ashlar panel. The anchoring is effected especially in an undercut blind hole. The anchor is especially an anchor suitable for natural ashlar panels. In particular, its length in the unexpanded state corresponds to a maximum of 2.5 times the maximum diameter of the anchor in the unexpanded state, that is to say is relatively short compared with anchors for fixing in the bearing elements of a building. The anchor especially comprises an expansion element and/or can be anchored chemically in the panel-like component.

The invention further comprises a bolt which has an external threaded portion complementary to the internal thread of the anchor and, in addition, a load-application means. The anchor and the bolt together form a combination according to the invention. In the finished mounted fixing arrangement according to the invention, the bolt has been screwed into the anchor by its external threaded portion and the load-application means serves for the connection to a substructure. The main body of the bolt can be, for example, a threaded rod or a screw, the external thread or the head of the screw forming the load-application means. According to the invention there is arranged on the bolt, between the load-application means and the external threaded portion, a stop element which is larger in diameter than the external threaded portion. "Larger in diameter" means in this context that a first circle circumscribing the stop element is larger than a second circle circumscribing the external threaded portion. The stop element can be integral with the bolt, but need not be. A first end of the stop element, facing the anchor, is supported against the anchor. For that purpose it can rest directly against an end face of the anchor, but the support can also be provided indirectly via a further component, for example a washer. The fixing arrangement according to the invention provides that a substructure, for example a profile or angle element, is supported against a second end of the stop element facing away from the anchor. In this case too, this can be effected by direct or indirect contact.

The combination according to the invention, or the fixing arrangement which can thereby be created, has the advantage that the anchor can also be set in a recessed position in the panel-like component. Since the anchor does not protrude, the panel-like component can easily be stacked without any gaps. The bolt's stop element lengthens the anchor and its second end provides a stop face outside the panel-like component, despite the recessed position of the anchor. The possibility of setting the anchor in a recessed position means that the anchor can be set to residual wall thickness, that is to say always at the same distance from the outer surface of the panel-like component. When identical components are used this has the result that the second end of the stop element is also always positioned at the same distance from the outer surface. Laborious adjustment of the panel-like components in the region of the substructure is accordingly unnecessary, allowing rapid mounting of the façade.

The anchor and bolt combination according to the invention provides that either the load-application means is a screw head and the stop element is longitudinally displaceable, or the load-application means is a thread, especially an external thread, and the stop element is longitudinally immovable and is larger in diameter than the load-application means. In both cases the bolt can easily be screwed into the anchor by hand and structural implementation is possible using simple means. In the first case the bolt can be, for example, a standard screw and the stop element a nut, while in the second case the bolt can be, for example, a threaded rod and the stop element can be a nut secured to the threaded rod by peening or adhesive bonding.

Preferably the anchor is set in a recessed position. This ensures that in the case of a large number of fixings and varying thicknesses of the panel-like components none of the anchors protrudes from the panel-like component and the panel-like components are accordingly stackable. The amount of recess is preferably from 1 to 6 mm, especially from 2 to 4 mm, so that customary thickness tolerances of natural ashlar panels are reliably compensated for. In particular, the height of the stop element, that is to say its extent in the longitudinal direction, is the same as or greater than the amount of recess.

In a preferred fixing arrangement, the first end of the stop element, facing the anchor, is supported against a bearing shoulder of the panel-like component. The support has the advantage that in the event of compressive forces, for example caused by wind pressure, those forces can be transmitted from the panel-like component directly to the stop element and the risk of the anchor's breaking through the panel-like component in the region of the base of the blind hole is thereby reduced. The support can be achieved on the one hand by the anchor's not being set in a recessed position, so that the first end of the stop element is supported in one plane both on the anchor and on the inner surface forming the bearing shoulder. On the other hand, however, it is also possible to provide a step in the blind hole and/or for the stop element to have a stepped first end. In general, in the case where the stop element rests both on the anchor and on a bearing shoulder of the panel-like component, that is to say two-fold contact, care should be taken that, by adhering to suitable tolerances, the stop element is clamped against the anchor and rests on the bearing shoulder only lightly or only in the event of compressive forces.

If such two-fold contact is undesirable, the stop element is smaller in diameter than or has the same diameter as the anchor in the unexpanded state. The size comparison is again directed at a comparison of the circles circumscribing the components in question. Since the anchor is introduced into the blind hole in the unexpanded state, the stop element is accordingly also smaller in diameter than or has the same diameter as the blind hole. Such a stop element accordingly has the result that the stop element is able to project into the blind hole without coming to rest in or against the blind hole.

Preferably the stop element has tool-application faces either for displacement along the bolt or for clamping the bolt against the anchor. Tool-application faces that come into consideration are especially external parallel flattened portions for engagement by wrenches, or hexagonal or Torx sockets. Alternatively or in addition, tool-application faces are arranged on the load-application means.

The invention is explained below with reference to three exemplary embodiments, each shown in a Figure.

DETAILED DESCRIPTION OF THE INVENTION

Figure 1:
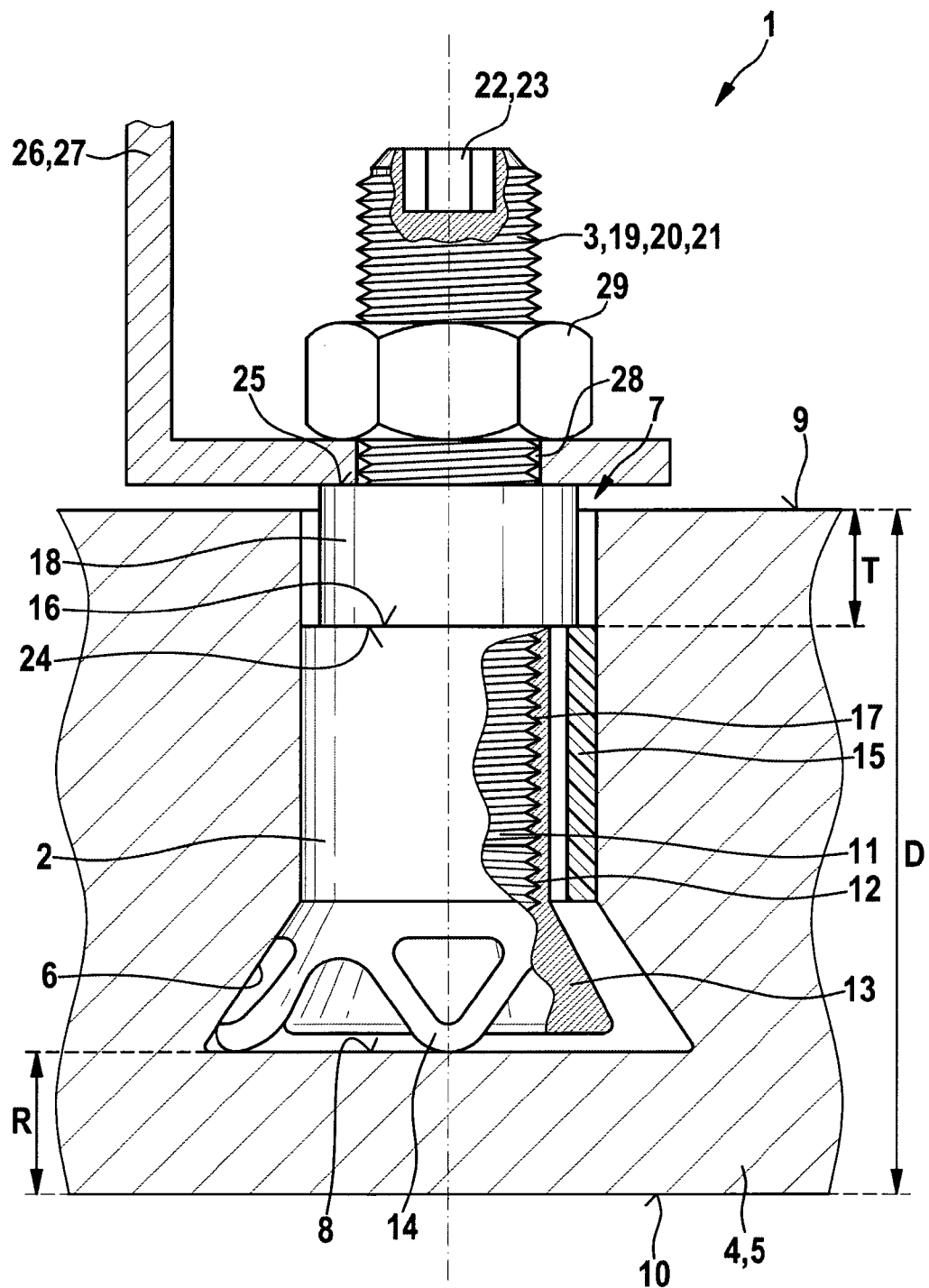
FIG. 1 is a section view of a fixing arrangement according to a first exemplary embodiment.
Figure 2:
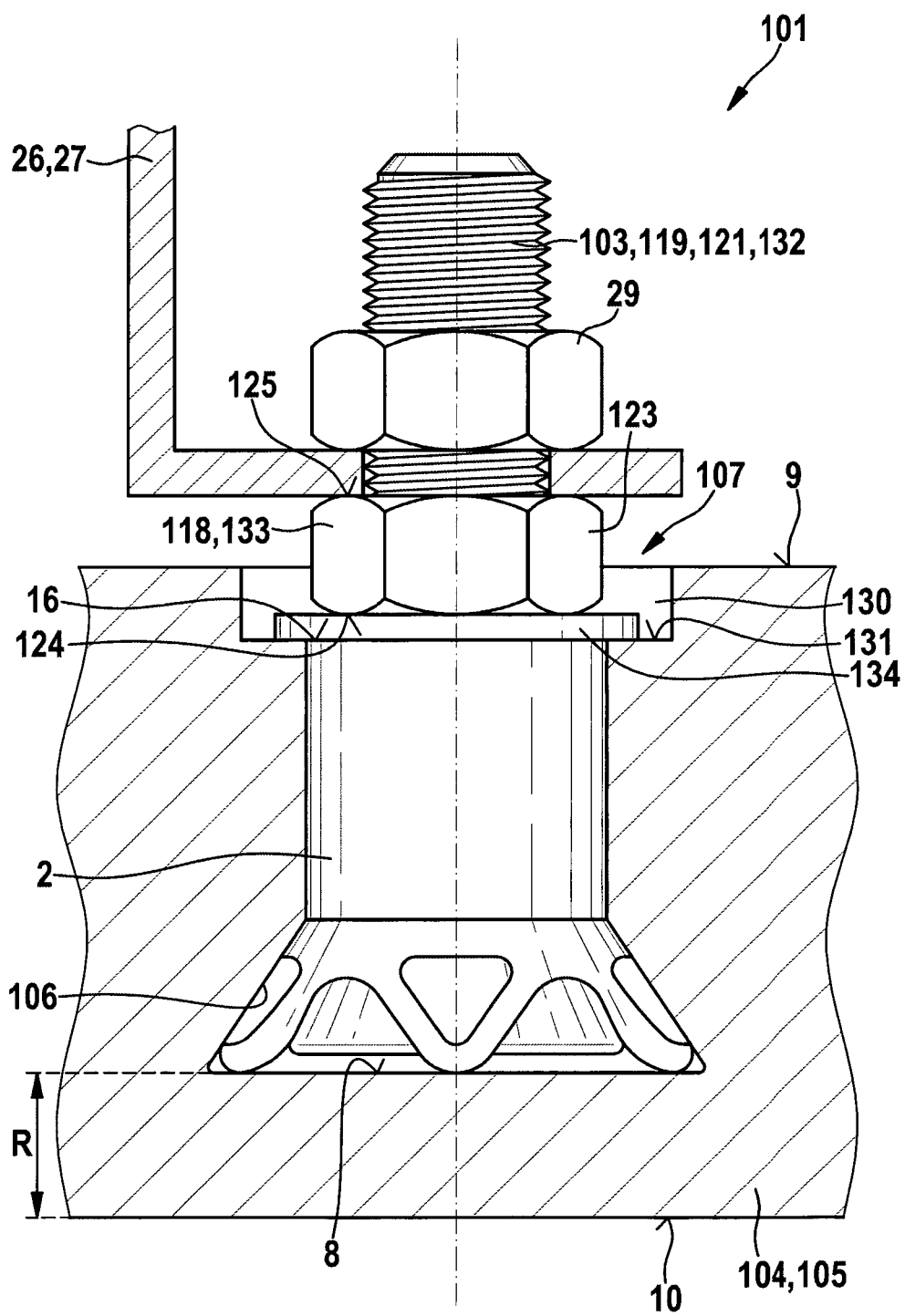
FIG. 2 is a sectional view of a fixing arrangement according to a second exemplary embodiment.
Figure 3:
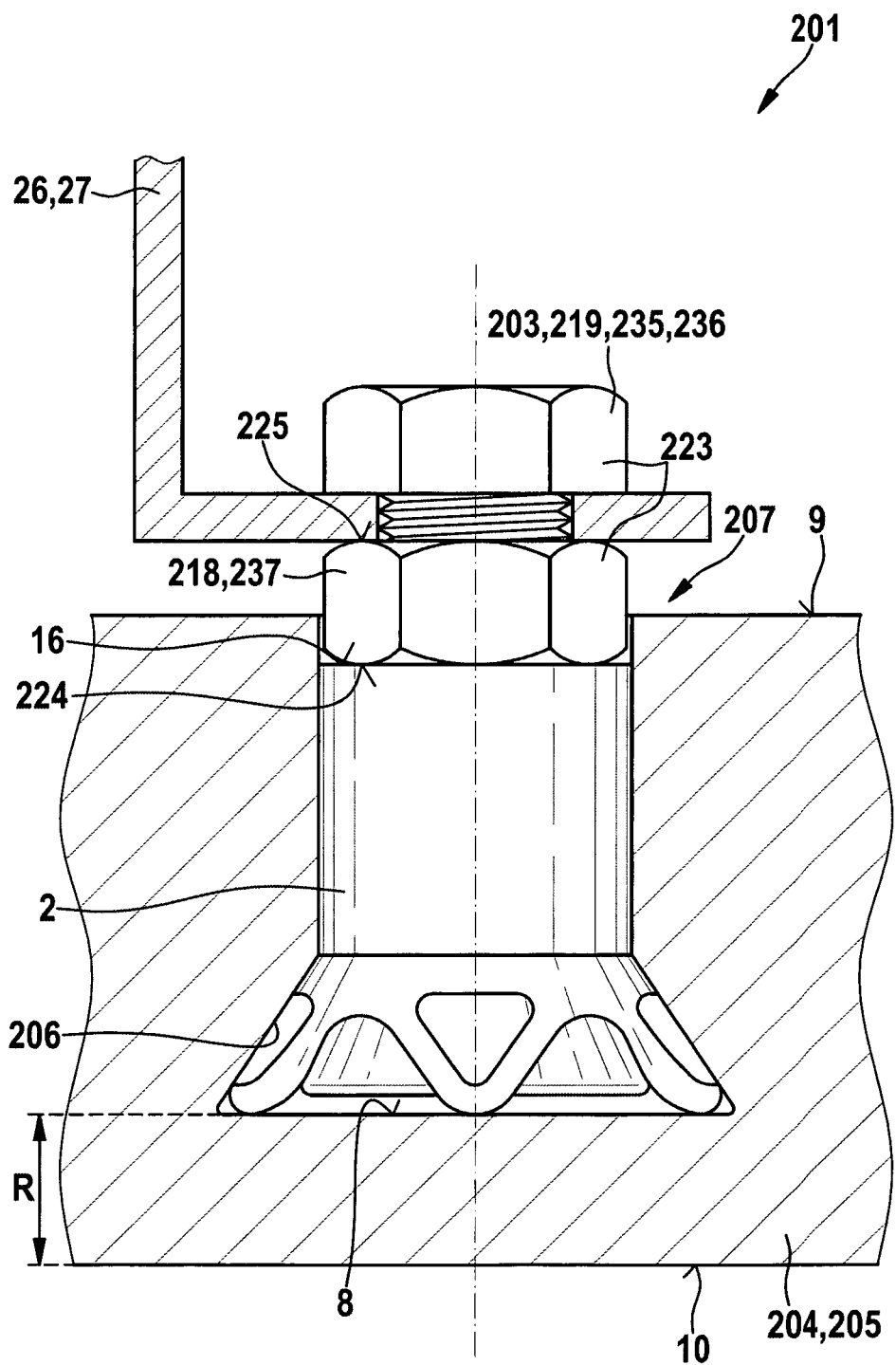
FIG. 3 is a sectional view of a fixing arrangement according to a third exemplary embodiment.

FIGS. 1 to 3 each show a sectional view of a fixing arrangement 1, 101, 201, according to the invention, which in turn each comprises a combination according to the invention comprising an anchor 2 and a bolt 3, 103, 203. First of all the basic structure will be explained with reference to the first exemplary embodiment shown in FIG. 1, and then in the case of the other two exemplary embodiments only the differences will be explained with reference to FIGS. 2 and 3. In the Figures, identical elements are denoted by identical reference numerals.

The fixing arrangement 1 is used for fixing a panel-like component 4 in the form of a natural ashlar panel 5 to a building structure (not shown). For that purpose, first of all an undercut blind hole 6 has been made in the natural ashlar panel 5. From a mouth 7 of the blind hole 6, the blind hole 6 initially extends cylindrically and then widens conically towards a base 8. The blind hole 6 has been drilled from the direction of an inner surface 9 of the natural ashlar panel 5. It has been drilled to a depth sufficient that a predetermined residual wall thickness R remains between the base 8 and an outer surface 10. The outer surface 10 forms a visible face of the façade formed by the natural ashlar panel 5.

The anchor 2 has been introduced into the blind hole 6. The anchor 2 is configured specifically for the fixing of panel-like components. In the unexpanded state (not shown) the ratio of its length to its maximum diameter is approximately 1.8, that is to say it is relatively short. A main body 11 of the anchor 2 made of metal has a sleeve-like portion which faces in the direction of the mouth 7 of the blind hole 6 and has an internal thread 12 passing through it. That portion is followed in the direction of the base 8 of the blind hole by an expansion cone 13 of conically increasing diameter. The internal thread 12 extends also into this expansion cone 13, that is to say over the entire length of the main body 11. To anchor the anchor 2, an expansion sleeve 14 is pushed over the expansion cone 13. In so doing, starting from a diameter corresponding approximately to the cylindrical portion of the blind hole 6, the expansion sleeve is conically expanded. The expansion is effected by means of a sleeve 15 made of plastics which surrounds the main body 11 and which for that purpose is displaced along the longitudinal axis of the anchor 2 relative to the main body 11 until it reaches the position shown. The end of the sleeve 15 facing the mouth 7 of the blind hole 6, together with the corresponding end of the main body 11, forms an end face 16 of the anchor 2.

For the erection of a façade, a multiplicity of such natural ashlar panels 5 are in this way provided with anchors 2 at the works, that is to say, for example, by the manufacturer of the natural ashlar panels 5. For production-related reasons, the thicknesses D of the natural ashlar panels 5 vary by about +/−1 mm. According to the invention, each of the blind holes is drilled to a depth sufficient that the same residual wall thickness R always remains. That thickness is determined so that a depth T by which the anchor 2 is recessed relative to the inner surface 9 of the natural ashlar panel 5 is always from 2 to 4 mm. The recess results from the displacement of the end face 16 relative to the inner surface 9 of the natural ashlar panel 5. Since none of the anchors 2 projects beyond the inner surface 9, the natural ashlar panels 5 are easy to stack without intermediate layers or the like and can be transported to a building site in the form of a compact stack.

The bolt 3 has been screwed by an external threaded portion 17 into the internal thread 12 of the anchor 2. This mounting step can take place, for example, onsite at the building site where the natural ashlar panel 5 is to form part of a façade. The external threaded portion 17 is adjoined integrally by a cylindrical stop element 18 of increased diameter and is in turn adjoined integrally by a load-application means 19 in the form of an externally threaded bolt 20 having an external thread 21. The stop element 18 has a smaller diameter than the anchor 2 in the unexpanded state and therefore fits with play into the blind hole 6. The length of the stop element 18 is greater than the depth T of the recess, so that the stop element 18 projects out of the blind hole 6. The externally threaded bolt 20 and the external threaded portion 17 have the same diameter, but are here shown having different lengths. They could also be of the same length, however, so that conversely the bolt 3 can also be screwed into the anchor 2. The externally threaded bolt 20 has at its end a hexagonal socket 22 with tool-application faces 23. By means of the hexagonal socket 22, the bolt 3 has been screwed into the anchor 2 until a first end 24 of the stop element 18, facing the anchor 2, rests against the end face 16 of the anchor 2 and is in that way supported against the anchor 2. An oppositely located second end 25 of the stop element 18 serves to make contact with a substructure 26 which here is represented only in part by a sheet metal angle 27. The sheet metal angle 27 has a hole 28 through which the externally threaded bolt 20 projects. The sheet metal angle 27 is clamped against the stop element 18 with a first nut 29. The substructure 26 can comprise, for example for a façade, a system of horizontal and vertical profiles and also cramps and brackets (not shown), which are not important here, however.

Since in the case of different thicknesses D of the different natural ashlar panels 5 the same residual wall thickness R is always maintained, the substructure 26 is always the same distance from the outer surface 10 of the natural ashlar panel 5. If, therefore, the sheet metal angles 27 are mounted, for example, in a straight horizontal profile (not shown), the outer surfaces 10 of the natural ashlar panels 5 will automatically lie in one plane. Accordingly no adjustment work is necessary, which considerably simplifies mounting.

In the fixing arrangement 101 shown in FIG. 2, although the blind hole 106 has likewise been drilled to the same residual wall thickness R, in addition a step 130 has been formed at the mouth 107 during the drilling. In the event of variations in the natural ashlar panels 105, that step 130 is always the same distance from the base 8 of the blind hole 106. The step 130 forms a bearing shoulder 131 for the stop element 118.

A bolt 103 has again been screwed by an external threaded portion (not shown) into the anchor 2. In this exemplary embodiment, however, the bolt 103 is a threaded rod 132, onto which a second nut 133 has been screwed as stop element 118 and has been secured to the threaded rod 132 by peening or adhesive bonding, so that the stop element 118 is immovable longitudinally. This allows simple construction from standard parts. The first end 124 of the stop element 118, facing the anchor 2, is supported both on the anchor 2 and on the bearing shoulder 131 of the natural ashlar panel 105. The support is provided, however, not by direct contact but by way of a washer 134. The two-fold support has the advantage that compressive forces exerted on the outer surface 10 of the natural ashlar panel 5, for example by wind pressure forces, are not transmitted to the anchor 2 in the region of the mouth 107 of the blind hole 106 but are transmitted to the bolt 103 by way of the bearing shoulder 131. Particularly in the case of small residual wall thicknesses R, the risk of breaking through the natural ashlar panel 105 in the region of the mouth 107 of the blind hole 106 is accordingly avoided.

In the third exemplary embodiment shown in FIG. 3, the bolt 203 is formed by a screw 235 having a hexagonally shaped screw head 236 as load-application means 219. The creation of the blind hole 206 and the pre-mounting of the anchor 2 is effected as in the first exemplary embodiment. For fixing the sheet metal angle 27, first of all a third nut 237 is applied to the end face 16 of the anchor 2 and then the sheet metal angle 27 is applied to the third nut 237. Then the screw 235 is screwed through the sheet metal angle 27 and the third nut 237 and clamped against the anchor 2. The third nut 237 accordingly serves as a longitudinally displaceable stop element 218. Its diameter is such that it fits into the blind hole 206, that is to say it is slightly smaller than or the same as the anchor 2 in the unexpanded state. In this exemplary embodiment too, the bolt 203 and the stop element 218 are formed by standard parts.

LIST OF REFERENCE SYMBOLS

1, 101, 201 fixing arrangement
2 anchor
3, 103, 203 bolt
4, 104, 204 panel-like component
5, 105, 205 natural ashlar panel
6, 106, 206 blind hole
7, 107, 207 mouth of the blind hole 6, 106, 206
8 base of the blind hole 6, 106, 206
9 inner surface of the natural ashlar panel 5, 105, 205
10 outer surface of the natural ashlar panel 5, 105, 205
11 main body of the anchor 2
12 internal thread
13 expansion cone
14 expansion sleeve
15 sleeve
16 end face of the anchor 2
17 external threaded portion
18, 118, 218 stop element
19, 119, 219 load-application means
20 externally threaded bolt
21, 121 external thread
22 hexagonal socket
23 tool-application faces
24, 124, 224 first end of the stop element 18, 118, 218
25, 125, 225 second end of the stop element 18, 118, 218
26 substructure
27 sheet metal angle
28 hole in the sheet metal angle 27
29 first nut
130 step in the blind hole 106
131 bearing shoulder of the panel-like component 104
132 threaded rod 133 second nut
134 washer
235 screw
236 screw head
237 third nut
D thickness of the panel-like component 4, 104, 204
R residual wall thickness
T depth of recess

The invention claimed is:

1. A combination, comprising:
an anchor for panel components, the anchor having an internal thread, and
a bolt, with an external threaded portion, which is complementary to the internal thread, and a load-application means for connection of the anchor to a substructure,
wherein
on the bolt, between the load-application means and the external threaded portion, there is arranged a stop element which is larger in diameter than the external threaded portion, wherein an axial thickness of the stop element is maintained when under a compressive load by the anchor and the load-application means,
a first axial end of the stop element that forms a first axially facing stop surface that faces the anchor and that is supported against the anchor, and
either the load-application means is a screw head and the stop element is longitudinally displaceable relative to the bolt, or the load-application means is a thread and the stop element is longitudinally immovable relative to the bolt and is larger in diameter than the load-application means,
wherein the first axially facing stop surface abuts either an axially facing surface formed by the anchor, or the first axially facing stop surface abuts an axially facing surface formed by a spacer that is sandwiched between the stop element and the anchor.

2. The combination according to claim 1, wherein the stop element has the same diameter as or is smaller in diameter than an adjacent end of the anchor.

3. The combination according to claim 1, wherein tool-application faces are arranged on the stop element.

4. The combination according to claim 1, wherein tool-application faces are arranged on the load-application means.

5. The combination according to claim 1, wherein the load-application means is a screw head and the stop element is longitudinally displaceable relative to the bolt.

6. The combination according to claim 1, wherein the load-application means is a thread and the stop element is longitudinally immovable relative to the bolt and the stop element is larger in diameter than the load-application means.

7. The combination according to claim 1, wherein the load-application means is an external thread.

8. A fixing arrangement, comprising:
a panel component having a hole extending in a first axial direction from an inner surface of the panel,
in which an anchor is anchored, the anchor having an internal thread,
a bolt, with an external threaded portion, which is screwed into the internal thread, and a load-application means,
and a substructure which is connected to the anchor via the load-application means of the bolt,
wherein
on the bolt, between the load-application means and the external threaded portion, there is arranged a stop element which is larger in diameter than the external threaded portion, wherein an axial thickness of the stop element is maintained when under a compressive load by the anchor and the load-application means,
a first axial end of the stop element that forms a first axially facing stop surface that faces an axially facing surface of the anchor and that is supported against the anchor, and
a second end of the stop element that forms a second axially facing stop surface that faces away from the anchor and that is supported against the substructure,
wherein the axially facing surface of the anchor is recessed in the first direction from the inner surface of the panel.

9. The fixing arrangement according to claim 8, wherein the depth (T) of recess is from 1 to 6 mm.

10. The fixing arrangement according to claim 9, wherein the depth (T) of recess is from 2 to 4 mm.

11. The fixing arrangement according to claim 8, wherein the first end of the stop element, facing the anchor, is supported against a bearing shoulder of the panel component.

12. The fixing arrangement according to claim 8, wherein the anchor is anchored in an undercut blind hole.

13. The fixing arrangement according to claim 8, wherein the first axially facing stop surface abuts either the axially facing surface formed by the anchor, or the first axially facing stop surface abuts an axially facing surface formed by a spacer that is sandwiched between the stop element and the anchor.

14. The fixing arrangement according to claim 8, wherein the stop element has the same diameter as or is smaller in diameter than an adjacent end of the anchor.

15. The fixing arrangement according to claim 8, wherein the panel is a stackable panel.

16. The fixing arrangement according to claim 8, wherein the anchor is anchored in an undercut blind hole of the panel.

* * * * *